US008143932B2

(12) United States Patent
Lee

(10) Patent No.: US 8,143,932 B2
(45) Date of Patent: Mar. 27, 2012

(54) GRID CLOCK DISTRIBUTION NETWORK REDUCING CLOCK SKEW AND METHOD FOR REDUCING THE SAME

(75) Inventor: Dong-Hyun Lee, Yongin (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1325 days.

(21) Appl. No.: 10/423,942

(22) Filed: Apr. 28, 2003

(65) Prior Publication Data

US 2004/0017242 A1     Jan. 29, 2004

(30) Foreign Application Priority Data

Jul. 29, 2002   (KR) ..................... 10-2002-0044676

(51) Int. Cl.
*H03K 3/00*     (2006.01)
(52) U.S. Cl. ................................................. 327/293
(58) Field of Classification Search .......... 327/291–297; 326/93; 375/356; 716/6, 12–14
See application file for complete search history.

(56) References Cited

U.S. PATENT DOCUMENTS

| | | | | |
|---|---|---|---|---|
| 5,172,330 A | * | 12/1992 | Watanabe et al. ............... 716/17 |
| 5,396,129 A | * | 3/1995 | Tabira ............................ 326/93 |
| 5,398,262 A | * | 3/1995 | Ahuja ........................... 375/356 |
| 5,481,209 A | * | 1/1996 | Lim et al. ....................... 326/93 |
| 5,880,607 A | * | 3/1999 | Mitra ............................. 326/93 |
| 6,157,237 A | * | 12/2000 | Mitra ............................ 327/295 |
| 6,266,803 B1 | | 7/2001 | Scherer et al. ................. 716/12 |
| 6,311,313 B1 | | 10/2001 | Camporese et al. .............. 716/6 |

FOREIGN PATENT DOCUMENTS

JP     2000-294734     10/2000

OTHER PUBLICATIONS

Chinese Office Action dated Mar. 31, 2006 and translation.
Office Action for corresponding Chinese Application No. 03145385.6 dated Nov. 2, 2007 and English Translation thereof.
Office Action dated Mar. 2, 2009 issued in corresponding Taiwanese Application No. 092116360 and English translation thereof.

* cited by examiner

*Primary Examiner* — Lincoln Donovan
*Assistant Examiner* — Khareem E Almo
(74) *Attorney, Agent, or Firm* — Harness, Dickey & Pierce, PLC

(57) ABSTRACT

A clock distribution network includes a plurality of clock drivers for outputting clock signals. At least one of the plurality of clock drivers has a driving capacity that is not equal to a driving capacity of at least another one of the plurality of clock drivers. The distribution network also includes a grid distribution network for distributing the clock signals output from the plurality of clock drivers.

18 Claims, 4 Drawing Sheets

FIG. 4A
(CONVENTIONAL)
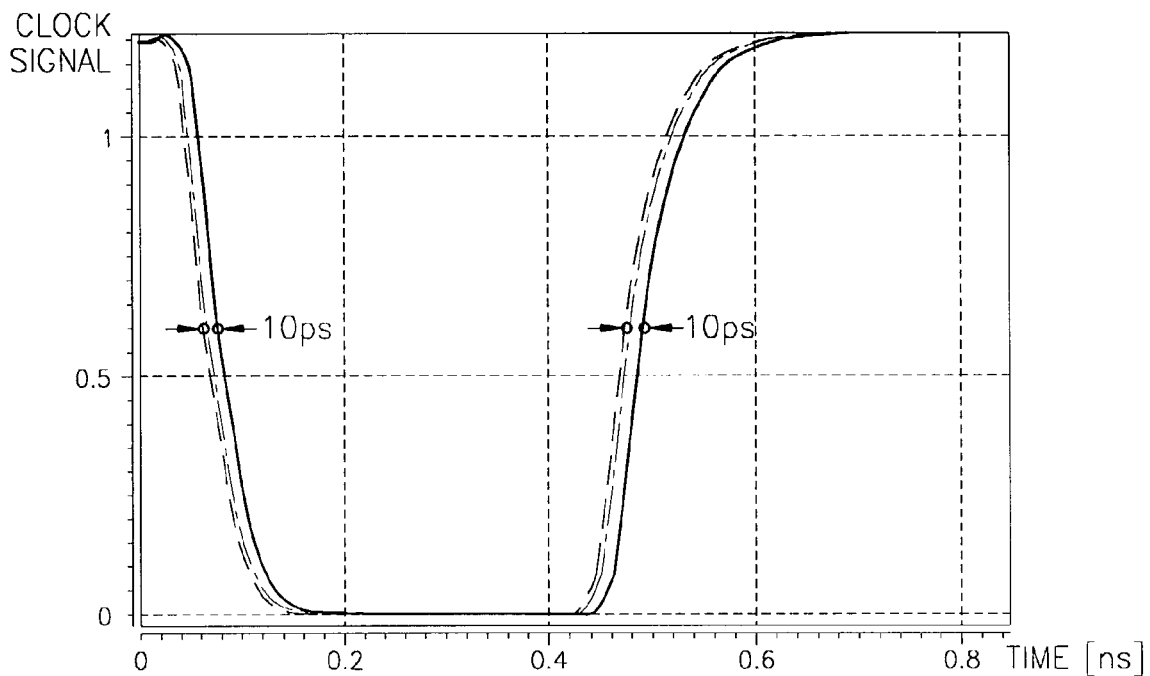

GRID CLOCK DISTRIBUTION NETWORK REDUCING CLOCK SKEW AND METHOD FOR REDUCING THE SAME

BACKGROUND OF THE INVENTION

This application claims the priority of Korean Patent Application No. 02-44676, filed Jul. 29, 2002, in the Korean Intellectual Property Office, the entire contents of which are hereby incorporated herein by reference.

1. Field of the Invention

The present invention generally relates to a clock distribution network, and more particularly, to a grid clock distribution network capable of distributing clock signals to a semiconductor integrated circuit (IC) chip through a grid distribution network.

2. Description of the Related Art

A clock distribution network is typically a circuit network through which clock signals may be transmitted to devices arranged on a semiconductor chip. It is desirable to maintain the phase relationship of the clock signals transmitted to the devices. In particular, it may be beneficial if the clock signals have substantially the same phase. However, because the devices may be positioned at different distances from clocking drivers, and/or the devices may have unique loading characteristics, received clock signals may differ in phase. That is, the clock signals may not reach each of the devices in a substantially simultaneous manner, thereby possibly causing the undesirable phase offset. This clock signal phase difference is generally referred to as clock skew.

Clock skew may limit reduction of a clock cycle time. If the clock skew is large, the operating speed and performance of a semiconductor chip may be reduced. Thus, it may be desirable to reduce possible clock skew over a large region of a semiconductor chip.

A grid clock distribution network may provide a clock signal(s) having substantially constant clock skew over a large region of a semiconductor chip. Initial design of the grid clock distribution network is relatively uncomplicated. Such a the grid clock distribution network may be used in semiconductor chips that operate at high speeds, such as high-speed microprocessors.

Grid clock distribution networks may have some difficulty effectively managing undesirable clock skew between an outer boundary and a center of a semiconductor chip. That is, clock skew may occur based upon a location within the semiconductor to which clock signals are transmitted.

FIG. 1 illustrates a conventional grid clock distribution network. Referring to FIG. 1, the conventional grid clock distribution network may include a plurality of clock drivers 120 arranged in a vicinity of a chip region 110 and a distribution network 130. The plurality of clock drivers 120 may receive and output clock signals. The distribution network 130 may be arranged in an x-direction and a y-direction of the chip region 110, and clock signals output from the clock drivers 120 may be transmitted to devices of the chip region 110 through the distribution network 130. Here, the clock drivers 120 of the conventional grid clock distribution network have substantially the same size regardless of their location. That is, the clock drivers 120, which have substantially the same driving capacity, may be arranged in the vicinity of the chip region 110 at substantially the same interval. The clock drivers 120 are capable of supplying clock signals through the distribution network 130.

In the case of the above structure, an area A1 of FIG. 1 is a relatively short distance from the clock drivers 120. Therefore, clock signals generated by the clock drivers 120 are capable of reaching an area A1 in a relatively short timeframe. However, an area A2 of FIG. 1, which is substantially a center of the chip region 110, is relatively far from the clock drivers 120 as compared to the proximity of the area A1. Accordingly, a timeframe for clock signals transmitted from the clock drivers 120 to reach the area A2 may be greater than a timeframe needed for clock signals to be transmitted from the clock drivers 120 to reach the area A1. Therefore, clock skew may occur between the areas A1 and A2.

SUMMARY OF THE INVENTION

An exemplary embodiment of the present invention provides a grid clock distribution network capable of reducing clock skew over a substantial region of a semiconductor chip.

An exemplary embodiment of the present invention provides a clock distribution network that includes a plurality of clock drivers for outputting clock signals, at least one of the plurality of clock drivers having a driving capacity that is not equal to a driving capacity of at least another one of the plurality of clock drivers, and a grid distribution network for distributing the clock signals output from the plurality of clock drivers.

Yet another exemplary embodiment of the present invention provides a grid clock distribution network for distributing clock signals to circuit devices arranged in a chip region of a semiconductor integrated circuit. The network may include a plurality of clock drivers arranged in an x-axis direction and a y-axis direction in a vicinity of the chip region, the plurality of clock drivers for outputting clock signals, at least one of the plurality of clock drivers having a driving capacity greater than or less than a driving capacity of another one of the plurality of clock drivers. Moreover, the network may have a distribution network aligned with the x-axis direction and the y-axis direction of the chip region, the distribution network for receiving the clock signals output from the plurality of clock drivers and for transmitting the clock signals to the circuit devices.

Another exemplary embodiment of the present invention provides an apparatus that includes a signal distributing arrangement for distributing signals to a circuit region, and a plurality of signal driving elements operationally functional for providing signals to the signal distributing arrangement, at least one of the signal driving elements capable of driving a signal in a manner that differs from another one of the signal driving elements.

Still another exemplary embodiment of the present invention provides a method for supplying signals to semiconductor chip region having a plurality of circuit elements. The method may include driving a clock signal at a first rate, driving a clock signal at a second rate that is different from the first rate, and receiving the clock signals at different locations within the chip region at substantially the same time.

BRIEF DESCRIPTION OF THE DRAWINGS

The present invention will become more apparent by describing in detail exemplary embodiments thereof with reference to the attached drawings in which:

FIGS. 4A and 4B illustrate graphs comparing operational characteristics of a conventional grid clock distribution network and a grid clock distribution network according to an exemplary embodiment of the present invention.

DETAILED DESCRIPTION OF THE EXEMPLARY EMBODIMENTS

Figure 1:
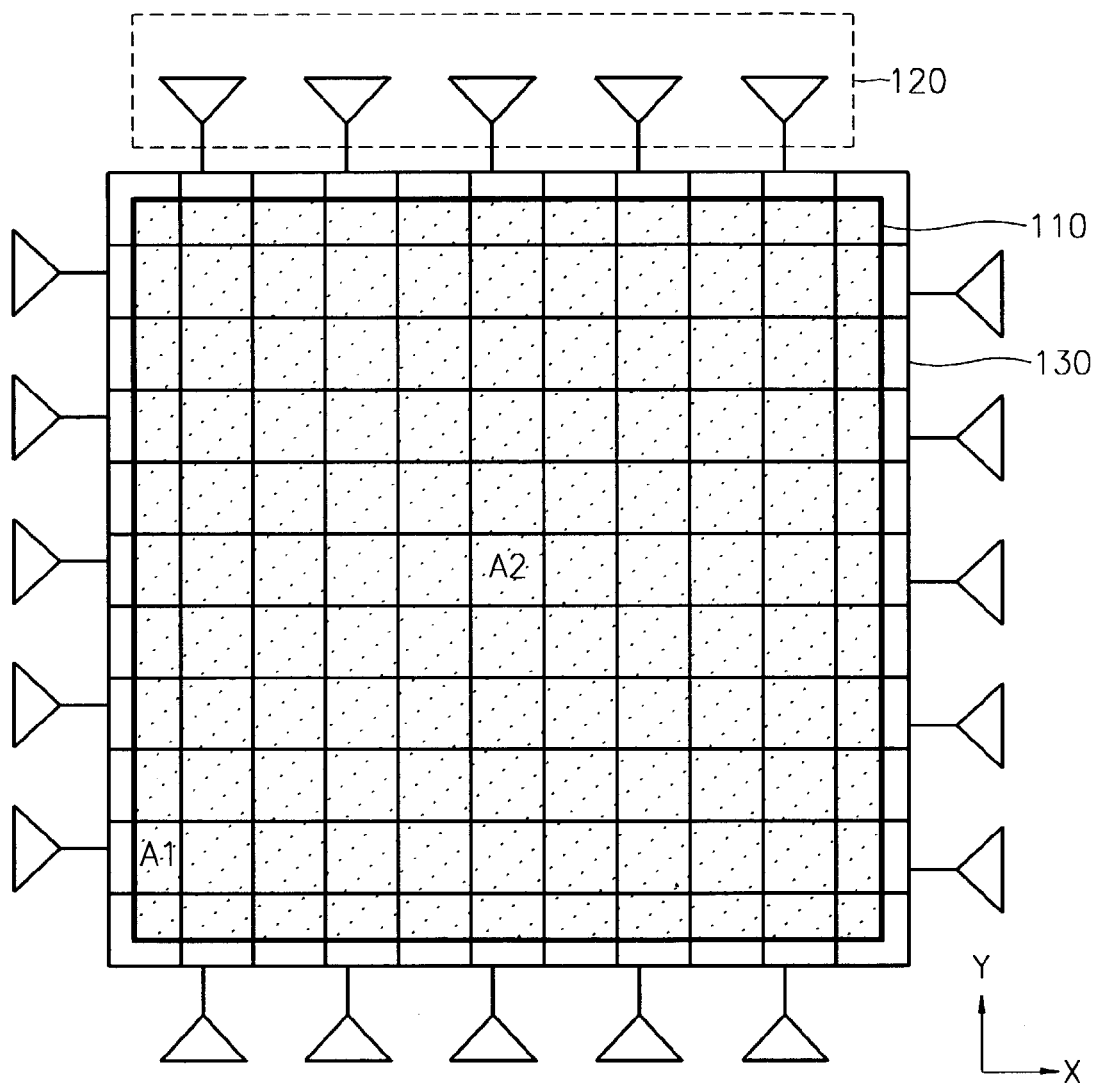
FIG. 1 illustrates a conventional grid clock distribution network.

Hereinafter, exemplary embodiments of the present invention will be described in detail with reference to the accompanying drawings. Like reference numerals refer to like elements throughout the drawings.

Figure 2:
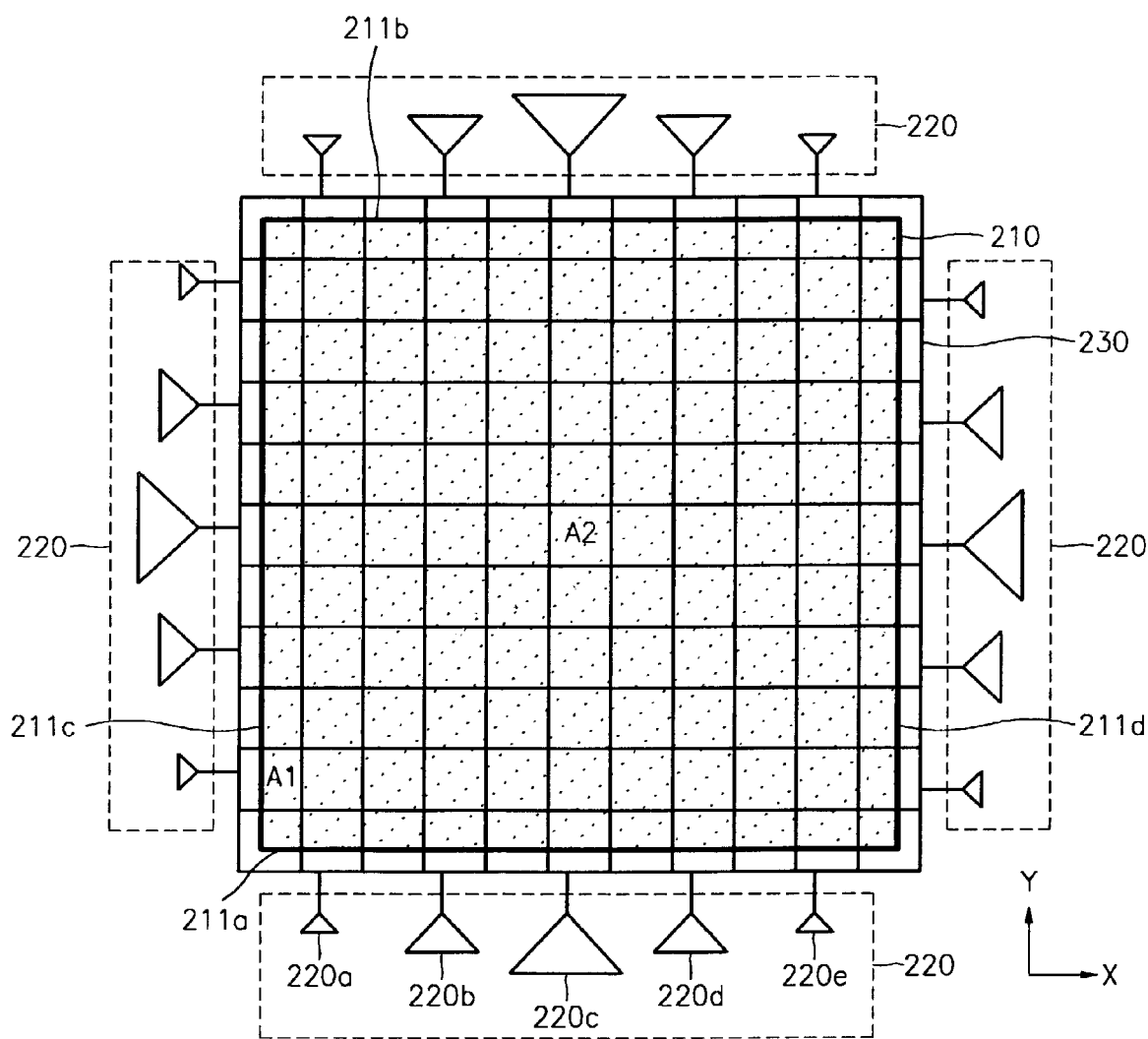
FIG. 2 illustrates a grid clock distribution network according to an exemplary embodiment of the present invention.

FIG. 2 illustrates a grid clock distribution network according to an exemplary embodiment of the present invention. Referring to FIG. 2, the grid clock distribution network according to an exemplary embodiment of the present invention may includes a plurality of clock drivers 220 and a distribution network 230.

The plurality of clock drivers 220 may be arranged in a vicinity of or external to a chip region 210. The plurality of clock drivers 220 may receive and output clock signals. The chip region 210 may encompass an entire region or encompass part of a semiconductor chip. Therefore, the clock drivers 220 may be arranged in the vicinity of the entire region of the semiconductor chip, or in the vicinity of a partitioned or sectioned semiconductor chip. Moreover, the clock drivers 220 may be arranged partially around an exterior of the chip region 210.

The distribution network 230 is a signal network through which clock signals output from the clock drivers 220 may be distributed to circuit devices arranged in the chip region 210. The distribution network 230 is illustrated as a grid having an x-axis and a y-axis and that is generally proportional in nature. The distribution network 230 may be constructed of metallic lines capable of carrying electrical impulses. The clock lines may include various logic elements integrated therewith. These logic elements may include, but are not limited to, flip-flops, logic gates (NAND, AND, NOR, etc.) and the like.

It is understood that the illustrated grid is but one example of a semiconductor chip layout. In particular, a semiconductor chip layout need not be symmetrical. Moreover, the semiconductor layer may include multiple layers that each include an array of clock lines. Therefore, the exemplary embodiments of the present invention may be used with a vast number of different production semiconductor devices that use clocking signals to operationally drive devices.

The clock drivers 220 according to an exemplary embodiment of the present invention may vary in size and/or have unique operational characteristics. One such operational characteristic that may vary in accordance with a size of a given clock driver is clock driving capacity. In an exemplary embodiment of the present invention, a clock driving characteristic of each of the clock drivers 220 may increase as a center of each of edges 211a, 211b, 211c, and 211d (hereinafter, reference numeral 211 is sometimes used to denote an arbitrary edge) is approached. Each edge 211 of the chip region 210 may be, for example, a boundary of the chip region 210 as defined by an operational requirements.

In one exemplary embodiment, a driving capacity of each of the clock drivers 220 may be adjusted by adjusting a size of each of the clock drivers 220, as shown in FIG. 2. The size of the clock drivers 220 may increase toward the center of each edge 211 of the chip region 210. For example, referring to the clock drivers 220 arranged on the x-axis along the bottom edge 211a, a clock driver 220c farthest from the y-axis edges 211c and 211d may be larger than the clock drivers 220a and 220e closest to the y-axis edges 211c and 211d. That is, the clock drivers 220a and 220e may be generally smaller than the clock driver 220c. Similarly, the size of the clock drivers 220 arranged along the y-axis edges may increase as a distance from the x-axis edges 211a and 211b increases.

A driving capacity of a clock driver may also be increased and/or decreased without actual modification in physical size. For example, a clock driver output may be modified, without changing an overall size thereof, by fine-tuning a wiring density of a given clock driver. Similarly, a level of a clock driver output may be customized in accordance with the type of signal driving circuitry used therein. The robustness of the driving circuitry is not necessarily dictated by size difference as those having ordinary skill in the art appreciate.

In one exemplary embodiment of the present invention, a driving capacity of each of the clock drivers 220 may be adjusted by changing a number of standard drivers used in each clock driver 220. The standard drivers may be of the same size or have varying sizes. For example, one standard driver having a size of '1' may be arranged in the clock driver 220 closest to an edge 211 of the chip region 210, and a number of standard drivers in each clock driver 220 may be increased as the center of the edge 211 is neared. Alternatively, a driving capacity of each of the clock drivers 220 may be adjusted by properly combining the size and number of clock drivers implemented therein.

Figure 3A:
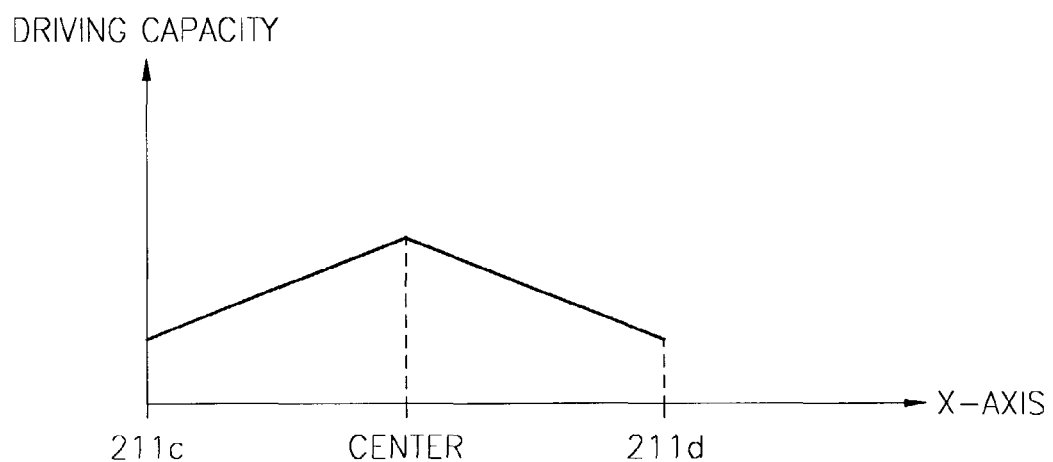
FIGS. 3A and 3B illustrate examples of a relationship between driving capacity of clock drivers and distance from edges of a chip region.
Figure 3B:
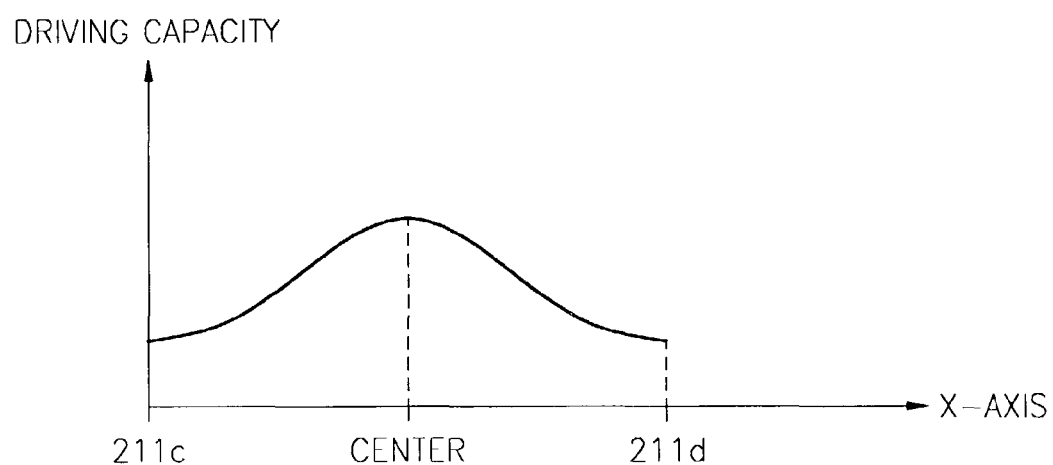

FIGS. 3A and 3B illustrate examples of a relationship between driving capacity of clock drivers and distance from edges of a chip region. As described herein, the driving capacity of each of the clock drivers 220 according to an exemplary embodiment of the present invention may vary in accordance with a distance from a closest edge 211 of the chip region 210. The relationship between a driving capacity and distance may be a proportionally linear relationship, as shown in FIG. 3A, or a functional relationship, as shown in FIG. 3B. Examples of the relationship between driving capacities of the clock drivers 220 the edge 211a and their respective distances from the edges 211c and 211d, are illustrated in FIGS. 3A and 3B.

As described, driving capacities of the clock drivers 220 may vary in accordance with the distance each clock driver 220 is situated from an end of each edge 211 of the chip region 210. That is, a clock signal transmitted to an area A1, which is in relatively close proximity to the clock drivers 220, may be delayed in comparison to and a clock signal transmitted to an area A2, which is a greater proximal distance from the clock drivers 220. Accordingly, the clock drivers 220 that transmit clock signals to a vicinity of the area A2 may transmit a clock signal having a faster rate than the clock drivers 220 that transmit to a vicinity of the area A1. Accordingly, regardless of a positioning in the chip region 210 of devices for receiving clock signals, the times at which the clock signals reach the devices are substantially equal. Accordingly, clock skew within the chip region 210 is reduced.

Figure 4B:
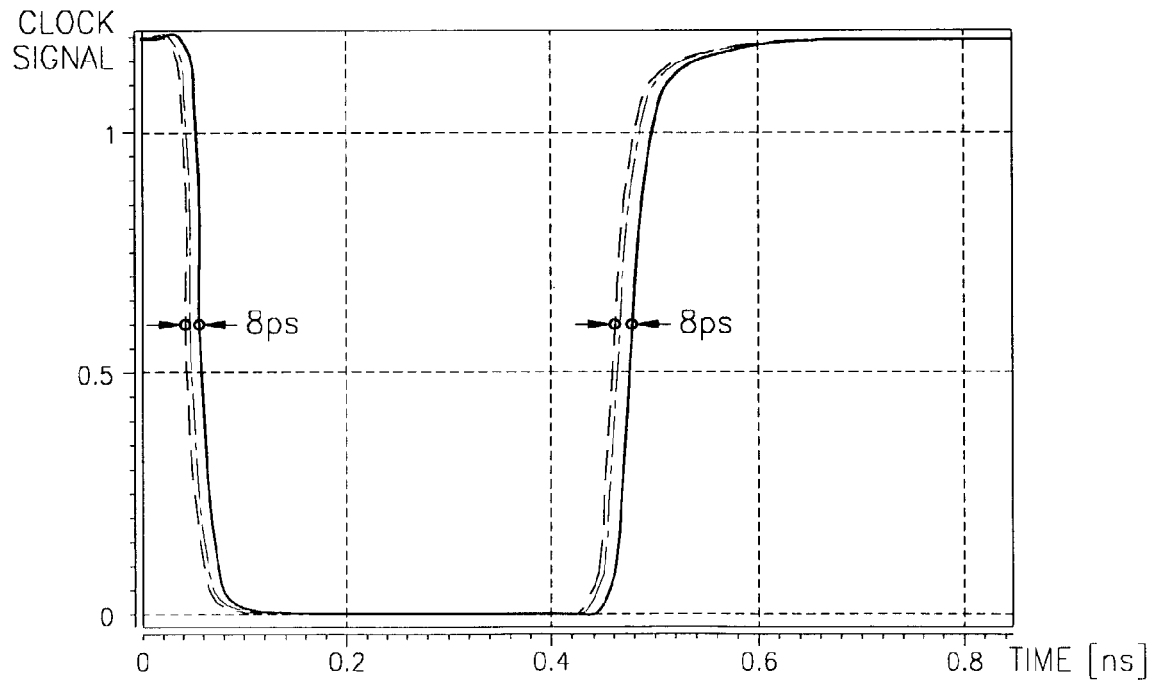

FIGS. 4A and 4B illustrate graphs comparing operational characteristics of a conventional grid clock distribution network and a grid clock distribution network according to an exemplary embodiment of the present invention. In FIGS. 4A and 4B, it is assumed that one cycle of a clock signal lasts for approximately 1 ns, i.e., 1000 ps.

Referring to FIG. 4A, a maximum skew between clock signals provided to circuit devices of a chip region is about 10 ps. That is, a difference in time between the fastest falling edge and the slowest falling edge, or a difference in time between the fastest rising edge and the slowest rising edge, is about 10 ps.

In contrast, referring to FIG. 4B, under the same conditions, a maximum skew between clock signals provided to circuit devices of a chip region is about 8 ps. Thus, clock skew is reduced by about 2 ps, compared with the conventional clock distribution network.

According to an exemplary embodiment of the present invention, skew between clock signals reaching an area in close proximity to clock drivers and clock signals reaching an area relatively distant from clock drivers may be reduced. Thus, a time at which clock signals reach circuit devices of a chip region is substantially constant, regardless of circuit device location.

Moreover, because clock skew within a chip region may be reduced, an improvement in performance and the operating speed of a semiconductor chip may be achieved.

Although the exemplary embodiments discuss specific examples for achieving reduction in clock skew within a chip region, other clock skew reduction alternatives may also be used. For example, clock drivers having differing driving capacities may be realized by selecting components and infrastructure that operate at varying impedance levels. In particular, components and infrastructure that have a relatively large impedance level may impede how fast clock signals can be transmitted. Conversely, components and infrastructure that have a relatively low impedance level may tend allow unencumbered transmission of clock signals. Components and infrastructure having various impedance levels may be used within the clock drivers, as the medium for transmitting signals to a chip region, and/or as part of a grid clock distribution network, in order to achieve substantial reduction of clock skew.

While the present invention has been particularly shown and described with reference to exemplary embodiments thereof, it will be understood by those skilled in the art that various changes in form and details may be made therein without departing from the spirit and scope of the invention as defined by the claims.

What is claimed is:

1. A clock distribution network, comprising:
a plurality of clock drivers for outputting clock signals, at least two of the plurality of clock drivers having unequal driving capacities; and
a grid distribution network functionally coupled to a chip region for distributing the clock signals output from the plurality of clock drivers, the chip region defined by n sides, where $n \geq 3$, the sides intersecting at n vertices, wherein the plurality of clock drivers are arranged along one side of the chip region such that a first clock driver having a first driving capacity $C_1$ is located a first minimum distance $D_1$ from the n vertices and a second clock driver having a second driving capacity $C_2$ is located a second minimum distance $D_2$ from the n vertices, and wherein the expressions $D_2 > D_1$ and $C_2 > C_1$ are both satisfied, further wherein the driving capacity of each clock driver is proportional to a separation distance D by which each clock driver is separated from the closest one of the n vertices.

2. The clock distribution network of claim 1, wherein:
each clock driver includes at least one sub-driver and has a driving capacity C which is proportional to the number of sub-drivers.

3. The clock distribution network of claim 1, wherein:
the driving capacity C of each clock driver is proportional to the size of the clock driver.

4. The clock distribution network of claim 1, wherein:
each clock driver includes at least one sub-driver and has a driving capacity C which is proportional to the number and relative sizing of the sub-drivers.

5. The clock distribution network of claim 1, wherein:
the second clock driver is positioned an equal distance from two vertices sharing a common side; and
a third clock driver having a third driving capacity $C_3$ is positioned between the second clock driver and the first clock driver, wherein the expressions $C_3 < C_2$ and $C_3 > C_1$ are satisfied.

6. The clock distribution network of claim 1, wherein:
the first clock driver provides a first clock signal for a first circuit device, the first circuit device being separated from the one side by a distance $L_1$; and
the second clock driver provides a second clock signal for a second circuit device, the second circuit device being separated from the one side by a distance $L_2$, wherein the expression $L_1 < L_2$ is satisfied.

7. A grid clock distribution network for distributing clock signals to circuit devices arranged in a chip region of a semiconductor integrated circuit, the network comprising:
a plurality of primary clock drivers arranged along each of n edges of the chip region for outputting clock signals, the edges of the chip region intersecting at n corners, $n > 3$, wherein the plurality of primary clock drivers arranged along each edge of the chip region are arranged such that a selected primary clock driver has a driving capacity that is greater than a driving capacity of any other primary clock driver positioned between the selected primary clock driver and a closest of two corners that define the edge; and
a distribution network arranged within the chip region for receiving the clock signals output from the plurality of primary clock drivers and transmitting the clock signals to the circuit devices.

8. The grid clock distribution network of claim 7, wherein:
each primary clock driver includes at least one sub-driver and has a driving capacity C which is proportional to the number of sub-drivers.

9. The grid clock distribution network of claim 7, wherein:
the plurality of primary clock drivers is arranged along the edges of the chip region at equal intervals.

10. The grid clock distribution network of claim 7, wherein:
the plurality of primary clock drivers is arranged symmetrically about axes bisecting the edges of the chip region.

11. The grid clock distribution network of claim 7, wherein:
the driving capacity of a selected primary clock driver is proportional to a minimum distance by which the selected primary clock driver is positioned from a closest of two corners that define the edge of the chip region along which the selected primary clock driver is positioned.

12. The grid clock distribution network of claim 7, wherein:
a first primary clock driver having a driving capacity $C_1$ provides a first clock signal for a first circuit device along a first edge, the first circuit device being separated from the one side by a distance $L_1$; and
a second primary clock driver having a driving capacity $C_2$ provides a second clock signal for a second circuit device along the first edge, the second circuit device being separated from the one side by a distance $L_2$, wherein the expressions $L_1 < L_2$ and $C_1 < C_2$ are satisfied.

13. A clock distribution network comprising:
a chip region bounded by a plurality of edges, each edge extending between two ends;
a grid distribution network extending over and selectively connected within the chip region; and a plurality of clock drivers connected to the grid distribution network and arranged along an edge of the chip region, the clock drivers configured whereby a clock driver having a first driving capacity is positioned between a closest of the two ends and all clock drivers having a higher driving capacity, wherein each clock driver has a driving capacity C that is proportional to a separation distance D between the clock driver and a closest end of the two ends that define an edge of the chip region along which the clock driver is positioned.

14. The clock distribution network according to claim 13, wherein:

each plurality of clock drivers is arranged along an edge such that a clock driver having a first driving capacity is positioned between a closest of the two ends and all clock drivers having a higher driving capacity.

15. The clock distribution network according to claim 14, wherein:

the chip region is rectangular and each of the pluralities of clock drivers includes at least five clock drivers, the clock drivers being configured to provide at least three different driving capacities.

16. A method for supplying signals to a semiconductor chip region having a plurality of circuit elements, the method comprising:

driving clock signals using a plurality of clock drivers, wherein a first clock signal is driven at a first rate $R_1$ and a second clock signal is driven at a second rate $R_2$; and receiving the clock signals at different locations within the chip region at substantially the same time, the chip region defined by n sides, where n>3, the sides intersecting at n vertices, wherein the plurality of clock drivers are arranged along a side of the chip region such that a first clock driver driving at the first rate is positioned at a first minimum distance $d_1$ from a first closest one of the n vertices and a second clock driver driving at a second rate is positioned at a second minimum distance $d_2$ from a second closest one of the n vertices, and wherein the expressions $d_2 > d_1$ and $R_2 > R_1$ are satisfied, wherein the driving capacity of each clock driver is proportional to a separation distance D by which each clock driver is separated from the closest one of the n vertices.

17. The method of claim 16, wherein:

the first rate is faster than the second rate.

18. The method of claim 16, wherein:

the at least one clock signal driven at the first rate travels a shorter distance within the chip region than the another clock signal driven at the second rate.

* * * * *